(No Model.)
W. M. LLEWELLIN.
APPARATUS FOR CHECKING THE ARRIVAL OF EMPLOYÉS.
No. 275,229. Patented Apr. 3, 1883.
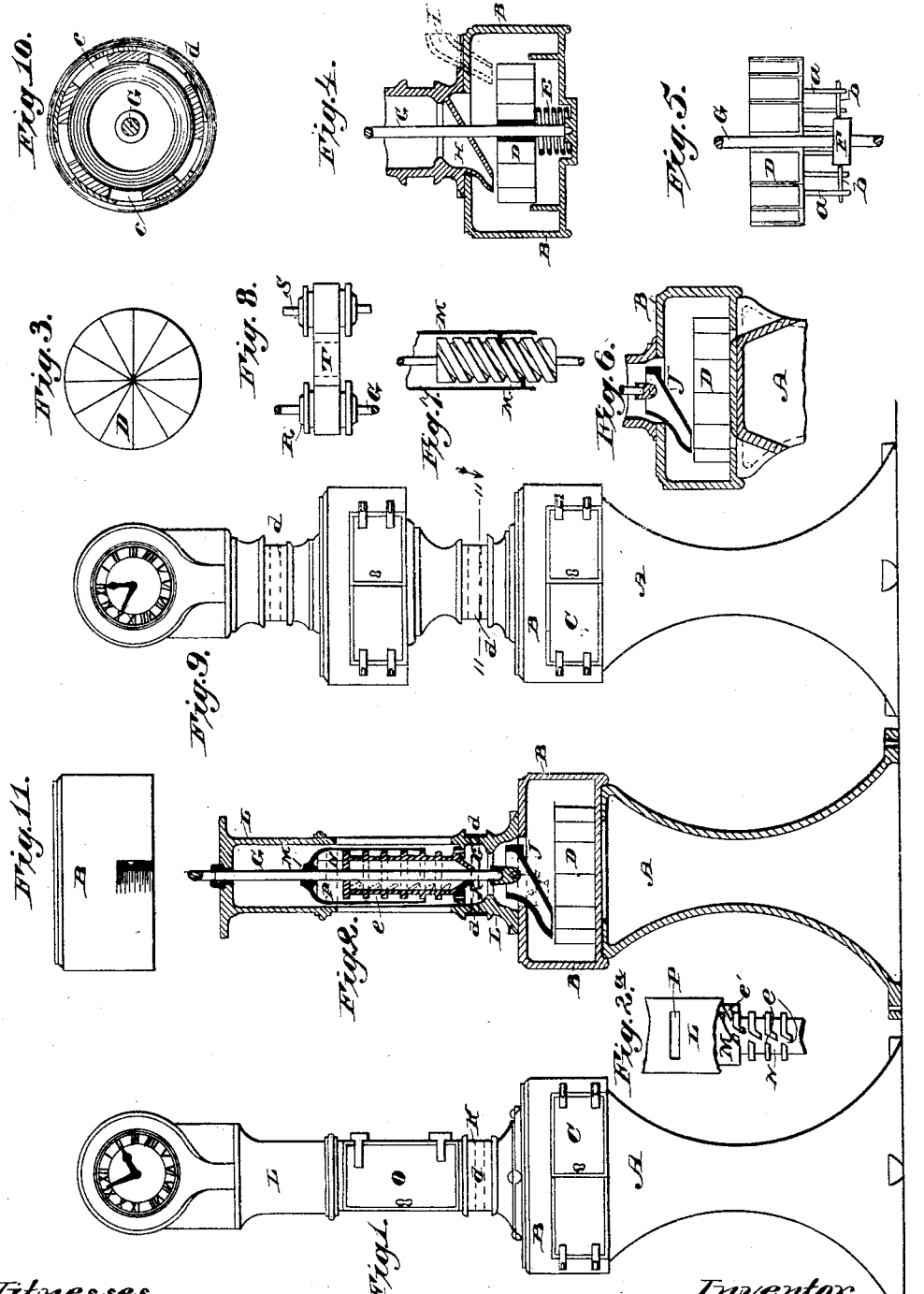
Witnesses
Geo. J. Tanner
H. C. Knight
Inventor
William M. Llewellin
By Knight Bros
Attys

UNITED STATES PATENT OFFICE.

WILLIAM M. LLEWELLIN, OF GLASGOW, COUNTY OF LANARK, SCOTLAND.

APPARATUS FOR CHECKING THE ARRIVAL OF EMPLOYÉS.

SPECIFICATION forming part of Letters Patent No. 275,229, dated April 3, 1883.

Application filed December 17, 1881. (No model.) Patented in England June 7, 1881, No. 2,472.

*To all whom it may concern:*

Be it known that I, WILLIAM MABERLY LLEWELLIN, a citizen of the United Kingdom of Great Britain and Ireland, residing at Glasgow, in the county of Lanark, Scotland, have invented certain new and useful Improvements in Apparatus for Checking or Indicating the Periodical Arrival and Departure of Employés, (for which I have received Letters Patent in Great Britain, No. 2,472, dated June 7, 1881;) and I do hereby declare that the following is a full, clear, and exact description of the invention, which will enable others skilled in the manufacture to which it appertains to make and use the same.

The invention consists, first, in the combination of a removable subdivided check-receiver with an outer inclosing-casing having a door for removing said check-receiver and provided with a hopper for conveying the checks to the receiver, either the hopper or the check-receiver being connected with time mechanism for presenting one or other of the compartments of the receiver to the incoming checks; second, in a chute having a series of slots or openings around its sides or on the top, so that in the event of a crowd there may be no delay in enabling the employés to deposit their checks. A movable ring or band surrounds or covers that part of the chute wherein the slits are made, the said ring or band being formed with corresponding slots or openings; third, in an independent device for recording the times of arrival or departure of managers, foremen, or others, of the construction hereinafter fully set forth; fourth, in a modified form of apparatus involving the use of a subdivided vertically-movable tally-box or check-receiver, and means for determining the contents thereof by weighing or recording. I attain these objects by the mechanism illustrated in the accompanying drawings, in which—

Figure 1 is an elevation, and Fig. 2 a vertical section, of one form of the said improved checking apparatus. Fig. 2ª is an elevation of a portion of the pillar, part broken away to show the construction of the interior cylinders. Fig. 3 is a plan of the check-box. Figs. 4 to 9 represent modifications of the details of the checking apparatus, which will be more fully described hereinafter. Fig. 10 is a transverse section taken through the inlet-openings and adjustable band; and Fig. 11, a side view, showing the pointer and graduated scale for determining the weight of the check-receiver.

The apparatus consists of a pillar or standard, A, on the upper end of which is secured a cylindrical box or casing, B, provided with doors C in one side. In the interior of the casing B a circular removable box or casing, D, is placed, the said box or casing being subdivided, as more particularly seen in plan at Fig. 3, into a series of compartments corresponding or approximately corresponding to the different times of arrival and departure of the work-people during one day—that is to say, one compartment is provided to hold the checks or tallies of those who are not late at such times of arrival, and another one or more compartments to hold the checks of those who are late, the amount of time late, when more than one such late compartment is provided, being approximately determined by the compartment of the box D into which the check falls.

The inner removable box, D, may either rest upon the bottom of the outer case, B, as shown at Fig. 2, or under another arrangement shown in vertical section at Fig. 4. It may be provided with and rest upon a spring-balance, E, for the purpose of weighing the checks or tallies deposited into its several compartments, the weight being indicated by a finger or pointer, as in the ordinary arrangement of spring-balances; or, alternatively, each compartment of the box D may be so provided with a weighing arrangement. From the weight the number of employés who have passed into the place of employment is ascertained, each check or tally being of a regulated weight, while at the same time the period of arrival or departure of each employé is also determined by the compartment of the box D in which that employé's check or talley is found. Under another arrangement (indicated in vertical section at Fig. 5) the inner removable box, D, is placed over a drum, F, upon which is wrapped a sheet of paper, and the said box, or each division of it, has a pointer, *a*, carrying a pencil, *b*, so placed that when a certain number of checks fall into the compartments the box or that individual compartment is depressed and the pencil makes a mark upon the paper wound round the drum. When this arrangement is used, and when each compartment of the box D is provided with a pointer, as described, each compartment is also provided with a spring-balance, and the said compartments are independent of each other, the box D being built up of segments, which may or may not be held together by an outer casing or band. Under another arrangement (indicated in vertical section at Fig. 6) the outer casing, B, and the inner box or casing, D, may be so arranged that the checks or tallies of those who are late will not be retained, but will pass through and out of the machine. To effect this, one or more divisions of the inner box, D, is or are made without any bottom, and in the bottom of the outer case, B, a slit or slits is or are made immediately under the bottomless compartments, whereby the checks or tallies dropped thereinto fall out of the apparatus, as indicated.

When an inner removable box of the construction shown at Figs. 4 and 5 is employed, the said box is or may be connected to a clock-work arrangement by the spindle G, whereby it is rotated so as to bring its several compartments underneath a stationary hopper and chute, which may be either arranged as shown at H or in dotted lines at I, Fig. 4, or in any other equivalent and convenient manner. In the arrangement Fig. 4, wherein the check or tally box D is rotary and connected to the actuating clock-work by the spindle G, the said box, for convenience of removal, is or may be made in segments or halves. When the inner removable box rests on the bottom of the outer casing, B, as in the arrangement shown at Figs. 2 and 6, the chute J, by which the tallies or checks are at the proper times delivered into the several compartments of the box D, is connected to the clock-work by the said spindle G, and is by the said clock-work rotated. The hopper K, through which the checks or tallies are dropped into the chute, constitutes in the arrangement Figs. 1 and 2 the lower end of a hollow pillar, L, bolted to the upper side of the casing B and formed with a series of holes or slits, c, around it, so that in the event of a crowd there may be no delay in enabling the employés to deposit their checks. A movable ring, d, Figs. 2 and 10, surrounds the hopper K, and in the said ring similar slots are made.

In using the improved apparatus it is intended that the employés shall be provided with different sizes of numbered checks or tallies to represent the different times of arrival or of arrival and departure during the day, and by partially rotating the ring or band d the slits or openings in the hopper are immediately, previously to such times, diminished in size from morning till evening, or vice versa, so that the check or tally provided for one of the periodical arrivals or departures cannot be passed into the box D at another. The checks, besides being of different sizes, may be of different colors, if desired. The ring or band d is provided with a lock to retain it in the position to which it has been adjusted.

In the hollow pillar L an arrangement of apparatus to check the periodical arrival and departure of managers, foremen, and others in charge is also provided. This apparatus consists of a cylinder, M, mounted on the same spindle, G, with the rotating chute, and rotated by the same clock-work which actuates the chute J or the revolving box D. The cylinder is covered with paper, and the paper surface is divided by horizontal lines into a series of spaces corresponding to the days of one week, month, or other period of time, and by vertical lines into spaces corresponding to the various times at which the managers or foremen should arrive and depart. Inside the cylinder M another cylinder, N, is mounted, stationary in the pillar L, and the said cylinder N has a series of collars or flanges around it. The distance between each of these collars or flanges represents a working-day; and in order that the cylinder M may fall one space each day it is provided with a pin or roller, $e'$, which rests upon one of these flanges or collars, and at the termination of each day's working-time the said pin $e'$ falls through an inclined groove, $e$, onto the collar or flange immediately below it, thereby moving the cylinder M downward one space.

In the pillar L a door, O, is made for the removal of the paper or card from the cylinder M and the substitution of a fresh paper or card therefor, and in the upper part of the said door, or in the pillar itself, a slot or hole is cut, as indicated in dotted lines at P, Fig. 2, and by full lines in Fig. 2$^a$, the size of which hole corresponds to one of the spaces between two of the horizontal and two of the vertical lines on the cylinder, and enables the manager or foreman to write his name or to make a pre-arranged mark in the said space. Instead of paper, the cylinder may have a papier-maché, porcelain, slate, or other surface capable of being cleaned.

Fig. 7 shows an arrangement for actuating the cylinder M by means of a screw instead of the stepped groove shown at Fig. 2; but in lieu of either of these arrangements the arrangement shown at Fig. 8 may be adopted, and which consists of two rollers or bobbins, one of which, R, is mounted upon the spindle G, connected to the clock-work, while the other, S, is carried in bearings in the pillar. On the roller or bobbin S a continuous ribbon of paper is wound, from which it is by the rotation of the spindle G gradually drawn onto the bobbin R, and the ribbon has spaces marked upon it, which at the proper times come opposite the part marked T, representing the hole or opening through the pillar, at which times they are written or marked upon by the manager or foreman.

Fig. 9 represents a modification of the apparatus having two check or tally boxes, one being for checking the arrival and the other the departure of the employés.

Under a modification indicated in dotted lines at Fig. 2, the lower end of the chute J may be hinged and have a pendulous motion imparted to it at certain times by a rod and bell-crank lever, or the equivalent of these connected to the clock-work by a spindle passing through the spindle G. Under this arrangement each compartment of the box D is subdivided into a series of concentric compartments, whereby the box is rendered capable of containing checks for more than one day, the chute being oscillated each day, so as to describe a circle of greater or lesser radius. Under another arrangement the chute may be dispensed with, and the top of the outer casing or box, B, formed with slits in it and rotated by the spindle G, so as to deposit the checks or tallies into the compartments of the inner box, D.

When two or more sets of the improved apparatus constituting this invention are used at the same place of occupation, they may each be provided with independent actuating clock-work, or they may all be actuated synchronously from a central clock by any of the well-known electric or pneumatic synchronizing arrangements.

Having fully described the invention, what it is desired to claim and secure by Letters Patent is—

1. In a time-check, the combination of the loose or removable subdivided box or receiver and the inclosing casing having a means for supporting said box, a side door, and a fixed top, with an inlet hopper or chute projecting through said fixed top, and time mechanism, substantially as described, arranged above the hopper for presenting one or other of the compartments thereof to the incoming checks, substantially as set forth.

2. In a time-check, the combination of a chute having a series of slots or openings and a movable slotted ring encircling the same, with a box or casing, and a tally-box placed therein, substantially as and for the purpose set forth.

3. In a time-check, the combination of the pillar or casing L, having the aperture P, the vertically-movable cylinder M, bearing markings indicating the days and hours, the stepped or graded cylinder N, and time mechanism for continuously actuating the recording-cylinder and presenting successive hours and days to the aperture P, substantially as specified.

4. In a time-check, the combination of the subdivided vertically-movable tally box or receiver D, and means, substantially as described, for determining the contents thereof, with a chute for directing the checks to said receiver, as and for the purpose set forth.

W. M. LLEWELLIN. [L. S.]

Witnesses:
   GEO. MACAULAY CRUIKSHANK,
   ROBERT MILLER,
   *Both of 135 Buchanan Street, Glasgow.*